(No Model.) 2 Sheets—Sheet 1.

J. REDDING.
COASTING HUB FOR CYCLES.

No. 593,688. Patented Nov. 16, 1897.

Witnesses
Wm. H. Edwards Jr.
Carroll J. Webster

Inventor
Jacob Redding
By Wm. Van Brown
Attorney (No Model.) 2 Sheets—Sheet 2.
J. REDDING.
COASTING HUB FOR CYCLES.
No. 593,688. Patented Nov. 16, 1897.
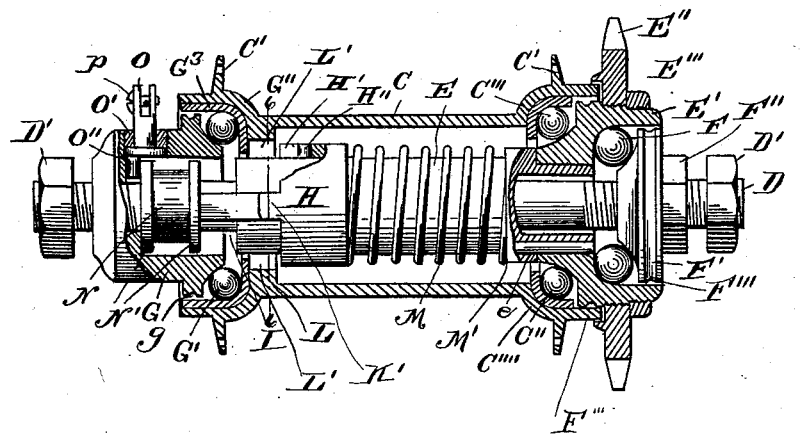
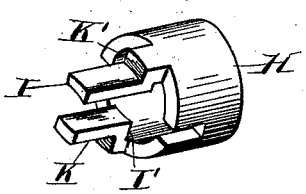
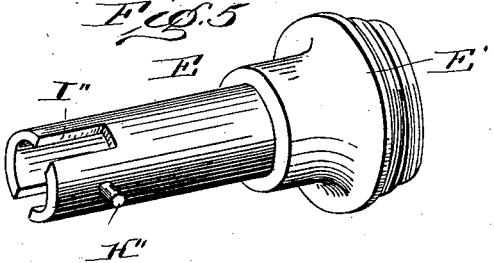
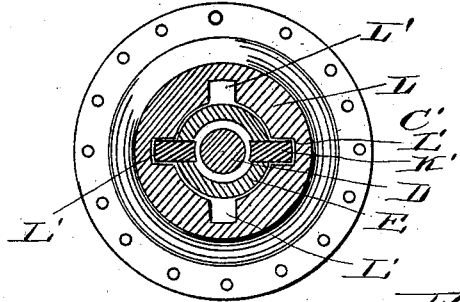
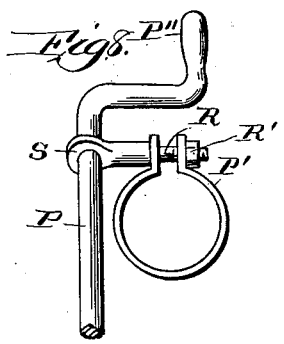
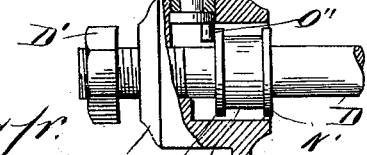
Witnesses
Wm. H. Edward Jr.
Carroll J. Webster
Inventor
Jacob Redding
by W. DuVal Brown
Atty.
THE NORRIS PETERS CO., PHOTO-LITHO., WASHINGTON, D. C.

UNITED STATES PATENT OFFICE.

JACOB REDDING, OF NEW CASTLE, INDIANA.

COASTING-HUB FOR CYCLES.

SPECIFICATION forming part of Letters Patent No. 593,688, dated November 16, 1897.

Application filed May 10, 1897. Serial No. 635,913. (No model.)

*To all whom it may concern:*

Be it known that I, JACOB REDDING, a citizen of the United States, residing at New Castle, in the county of Henry and State of Indiana, have invented certain new and useful Improvements in Coasting-Hubs for Cycles; and I do hereby declare the following to be a full, clear, and exact description of the invention, such as will enable others skilled in the art to which it appertains to make and use the same.

This invention relates to a new and useful improvement in coasting-hubs for cycles; and it consists in the construction and arrangement of parts hereinafter described, and definitely pointed out in the claims.

The aim and purpose of this invention is to mount the hub of the rear wheel so that it can be detached from or locked to the sprocket at will and by the rider without dismounting. When detached from the sprocket, the rear wheel can revolve independently of the sprocket and the machine can coast without the rider removing his feet from the pedals.

It is further the object to provide a clutch for locking the sprocket to the hub which can be easily operated by the rider from the seat and which can be operated without discomfort to the rider or jar to the parts.

A further object is to construct a dust-proof device and a device which will not detract from the appearance of the machine and which will be exceedingly light and cheaply manufactured.

These and other objects not hereinbefore mentioned are accomplished by the construction illustrated in the accompanying drawings, wherein like letters of reference indicate corresponding parts in the several views, and in which—

Figure 1:
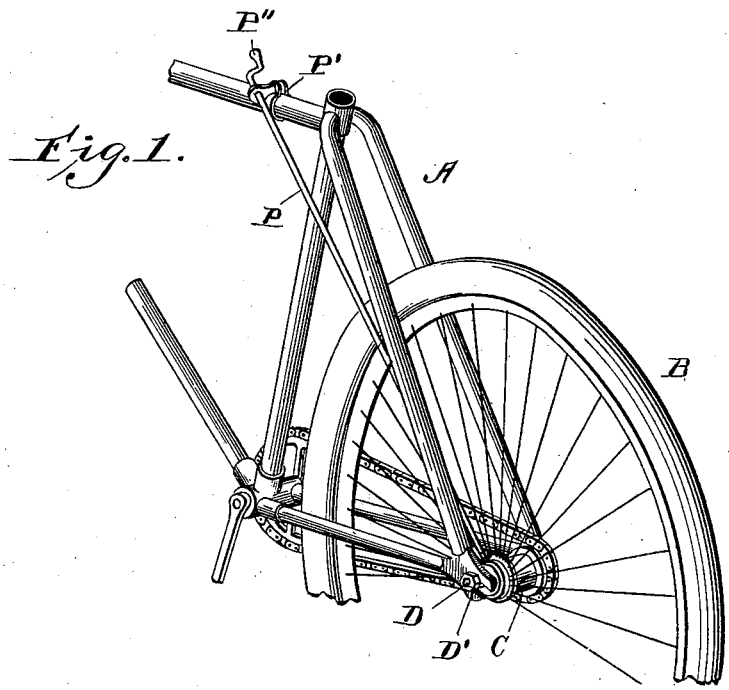
Figure 2:
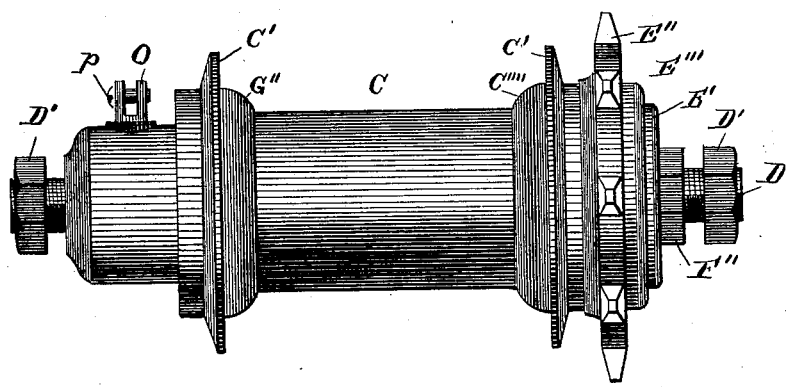

Figure 1 is a perspective view of the rear portion of a bicycle, showing the rear wheel with my improved coasting-hub and sprocket in position. Fig. 2 is a side elevation of my improved hub and sprocket detached from the frame. Fig. 3 is a vertical central longitudinal section of Fig. 2, parts being in elevation. Fig. 4 is a detail perspective view of the clutch-sleeve. Fig. 5 is a detail perspective view of the sprocket-sleeve and sprocket cone-nut secured to the sleeve on which the sprocket is mounted. Fig. 6 is a section on the line 6 6, Fig. 2. Fig. 7 is a detail view of the clutch-lever and sliding clutch-collar, and Fig. 8 is a detail view of the operating-lever and handle and the means for clamping it to the frame.

In the drawings, A designates the rear portion of the bicycle-frame, and B the rear wheel. The frame is of the ordinary safety pattern, and the wheel is of the usual construction, with the exception of the hub.

C designates the hub, provided with the spoke-disks C'.

D designates the usual stationary supporting-shaft for the rear wheel. This shaft is provided with the nuts D' for securing the shaft in position on the frame. Supported on the shaft D is the sprocket-sleeve E. Secured to one end of the sprocket-sleeve E is the sprocket cone-nut E', of hardened steel. The nut is secured to the sleeve by means of the pins e, which fit in grooves in the sprocket-sleeve. Screwed to the cone-nut is the sprocket E'', which is held in place on the nut by the lock-nut E''', which is screwed on the cone-nut by a reverse thread. The cone-nut E' is provided with an interior ball-race against which the balls F bear. The balls F are secured in place and bear against the cone-nut F', which is secured on the shaft D. The cone-nut is locked in place by means of the lock-nut F''. The cone-nut F' is provided with an annular grove F''', in which is secured means for excluding the dust.

The hub C is supported on the sprocket-sleeve by means of the balls C'', which bear against a hardened bearing-surface C''', which is secured in the enlargement C'''' of the hub. These balls C'' bear against an exterior ball-race on the cone-nut E'. It will thus be seen from the above-described construction that the sprocket-sleeve is supported on the stationary shaft D by ball-bearings, and in turn that the hub is also supported on the sprocket-sleeve by ball-bearings.

Screwed to the opposite end of the stationary shaft D' is the hollow cone-nut G. The nut extends inwardly and within the end of the hub and is provided with a ball-race on which are supported the balls G'. This end of the hub, like the opposite end, is provided with the enlargement G'', and within this enlargement the nut extends. The balls G' bear against a hardened bearing-surface G''', secured within the enlargement of the hub. It will thus be seen that one end of the hub is rotatably supported on the movable sprocket-sleeve and that the opposite end is rotatably supported on the stationary cone-nut G. The nut G is provided with an annular groove g within the enlargement of the hub, in which is secured any suitable means for excluding dust. From the description above described it will be seen that the sprocket-sleeve carrying the sprocket and the hub can revolve independently, which would be the case in coasting.

To lock the parts for ordinary riding, I provide the sprocket-sleeve with a clutch-sleeve H, which is adapted to slide thereon. The sleeve H is provided with the oppositely-arranged slots H', through which pass pins H'' on the sprocket-sleeve, allowing the clutch-sleeve to slide on the sprocket-sleeve, but not to revolve independent of the same. Projecting from the clutch-sleeve on opposite sides are the tongues I, as shown in Fig. 4. These tongues I project within the sleeve, forming the shoulders I', and fit within the slots I'' in the end of the sprocket-sleeve. From the above description it will be seen that while the clutch-sleeve has a sliding movement on the sprocket-sleeve this movement is limited in one direction by means of the pins H'', bearing against the end of the slots H' in the clutch-sleeve, and in the opposite direction by means of the shoulders I', bearing against the ends of the slots I'' in the sprocket-sleeve.

The outer surfaces of the tongues I are provided with the cut-away portion K, forming the shoulders K', as shown in Fig. 4.

The hub C is provided with the inwardly-extending enlargement L, in which is formed the oppositely-arranged grooves L', as shown in Fig. 6, and in which the shoulders K' of the tongues on the clutch-sleeve are adapted to engage, as also shown in Fig. 6.

M is a coiled spring surrounding the sprocket-sleeve, having one end bearing against a shoulder M', formed on the sleeve, and the opposite end bearing against the clutch-sleeve, normally pressing the said sleeve outward, or in the direction so that the shoulder K' will engage the slots L' in the enlargement of the hub. From the above description it will be seen that the sprocket-sleeve and hub are normally locked together by means of the spring M, so that the hub and sprocket will revolve as one wheel, as would be the case ordinarily.

In order to coast so that the rear wheel can revolve independently of the sprocket and pedals, and which is found to be very desirable, I provide means for disengaging the clutch-sleeve from the hub. This I accomplish by providing the shaft with a sliding collar N, which works within the hollow cone-nut G and bears against the ends of the tongues I on the clutch-sleeve. When the collar is moved to the right, looking at Fig. 2, it will be seen that the clutch-sleeve will also be moved, disengaging it from the hub and allowing the hub to revolve independently of the sprocket-sleeve.

The clutch-collar is provided with the annular shoulders N' on its opposite ends, one of which bears against the end of the tongues I.

O designates a clutch-throwing lever which extends through an aperture in the top of the hollow cone-nut G, and is secured in place in the aperture by means of the nut O', which is screwed in the aperture. The lever is provided with a pin O'', arranged eccentric thereon and which bears against the outer shoulder N' of the clutch-collar. When the lever is rotated, the collar will be moved to the right, releasing the parts for coasting. The pin O'' bears against the cone-nut G, as does the collar N, when the parts are locked, thereby firmly holding the parts in position. The lever is rotated by means of the rod P, which is secured to the clutch-lever by means of the screw p. The rod P extends upward to a point adjacent the seat and is secured to the top horizontal bar of the frame by means of a clip P', as shown in Figs. 1 and 8. The upper end of the rod is bent, as shown at P'', to form a handle. The clip consists of a circular piece surrounding the bar and secured in place by means of the screw-bolts R and nut R'. The handle passes through an apertured block S, which is secured to the clamp. It will thus be seen that the device can be operated by the rider without dismounting and with but little trouble. It will also be seen that the handle will be locked in position by the pressure exerted by the coiled spring M.

When my improved hub is applied to a wheel, it adds but little to the weight and does not detract from its appearance. It will be seen that the parts are housed in a dust-proof casing, and that the parts are firmly held from longitudinal movement in one direction by means of the cone-nut G, and that the nut can be locked to the shaft in any suitable manner. The parts can be readily adjusted by means of the cone-nut F' and the lock-nut F'''.

In applying my hub and sprocket to a drop-frame or woman's wheel I place the clip and handle on the inclined front bar of the frame and form the rod of two parts united by a universal joint adjacent the crank-hanger, so as not to interfere with the skirt of the rider.

While I have shown my device as applied to the rear wheel of a bicycle, it is evident that I do not intend to limit myself to this use, as it is evident that it could be applied to any kind of cycle or motor-vehicle desired. I am also aware that many minor changes can be made in the construction and arrangements of parts without in the least departing from the nature and principles of my invention.

Having thus described my invention, what I claim as new, and desire to secure by Letters Patent, is—

1. In a coasting-hub for cycles, the combination with a supporting-shaft, of a sprocket-sleeve rotatably and independently supported on the shaft, a hub rotatably and independently supported on the sprocket-sleeve, and means for clutching the sprocket-sleeve to the hub, substantially as described.

2. In a coasting-hub for cycles, the combination with a supporting-shaft, of a sprocket-sleeve rotatably and independently supported on the shaft, a hub rotatably and independently supported on the sprocket-sleeve, a clutch carried by the sprocket-sleeve for clutching the said sleeve to the hub and means for disengaging the clutch from the hub, substantially as described.

3. In a coasting-hub for cycles, the combination with a supporting-shaft, of a sprocket-sleeve rotatably and independently supported on the shaft, a hub rotatably and independently supported on the sprocket-sleeve, a clutch carried by the sprocket-sleeve and normally engaging the hub, a sliding member on the supporting-shaft for disengaging the clutch from the hub and means for actuating the sliding member, substantially as described.

4. In a coasting-hub for cycles, the combination with a supporting-shaft, of a sprocket-sleeve rotatably supported on the shaft, a hub rotatably supported on the sprocket-sleeve, a spring-actuated clutch carried by the sprocket-sleeve and normally engaging the hub, a sliding member on the supporting-shaft having one end engaging the clutch, a lever, an eccentric-pin on the lever engaging the opposite end of the sliding member, and means for rotating the lever to slide the member and release the hub against the tension of the spring, substantially as described.

5. In a coasting-hub for cycles, the combination with a supporting-shaft, of a sprocket-sleeve rotatably supported on the shaft, a hub rotatably supported on the sprocket-sleeve, a clutch normally locking the sprocket-sleeve to the hub, a hollow cone-nut supporting one end of the hub, a sliding member within the nut engaging the clutch and a lever passing through the nut for sliding the member to disengage the clutch from the hub, substantially as described.

6. In a coasting-hub for cycles, the combination with a supporting-shaft, of a sprocket-sleeve rotatably supported on the shaft, a hub rotatably supported on the sprocket-sleeve, a clutch normally locking the sprocket-sleeve to the hub, a hollow cone-nut supporting one end of the hub and provided with an aperture in its upper portion, a sliding member within the nut engaging the clutch, a lever passing through the aperture in the nut, a nut engaging the aperture for securing the lever in place, an eccentric-pin on the lever engaging the sliding member, and means for rotating the lever to slide the member and release the hub, substantially as described.

7. In a coasting-hub for cycles, the combination with a supporting-shaft, of a sprocket-sleeve rotatably supported on the shaft, a hollow cone-nut on one end of the shaft, a hub having one end rotatably supported on the sprocket-sleeve and its opposite end supported on the cone-nut and surrounding the inner end of the nut, a clutch normally locking the sprocket-sleeve to the hub, a sliding member within the cone-nut engaging the clutch and means extending to the outside of the cone-nut for sliding the member to disengage the clutch from the hub, substantially as described.

8. In a coasting-hub for cycles, the combination with a supporting-shaft, of a cone-nut screwed on the shaft, a sprocket-sleeve, a nut on the sprocket-sleeve carrying the sprocket, and provided with an exterior and interior ball-race, balls interposed between the interior ball-race and the cone-nut on the shaft, a hollow cone-nut on the opposite end of the shaft, a hub having one end rotatably supported on the hollow cone-nut, balls interposed between the opposite end of the hub and the exterior ball-race on the sprocket-nut, a clutch normally locking the sprocket-sleeve to the hub, a sliding member within the hollow cone-nut and means for sliding the member to disengage the clutch from the hub, substantially as described.

9. In a coasting-hub for cycles, the combination with a supporting-shaft, of a sprocket-sleeve rotatably supported on the shaft, a hub rotatably supported on the sprocket-sleeve, a pin on the sprocket-sleeve, a sliding clutch on the sleeve provided with a slot engaging the pin, a tongue extending from the clutch adapted to engage the hub, a spring for normally holding the tongue in engagement with the hub, and means engaging the end of the tongue for disengaging the tongue from the hub, substantially as described.

10. In a coasting-hub for cycles, the combination with a supporting-shaft, of a sprocket-sleeve rotatably supported on the shaft and provided with a slot on its inner end, a pin on the sprocket-sleeve, a sliding clutch on the sleeve provided with a slot engaging the pin, a tongue extending from the clutch engaging the slot in the sprocket-sleeve and adapted to engage the hub, a spring for normally holding the tongue in engagement with the hub, and means engaging the end of the tongue for disengaging the tongue from the hub against the tension of the spring, substantially as described.

In testimony whereof I affix my signature in presence of two witnesses.

JACOB REDDING.

Witnesses:
CHAS. S. HEMLY,
WM. RINEWALD.